United States Patent Office 3,441,319
Patented Apr. 29, 1969

3,441,319
HYDROSTATIC BRAKING APPARATUS WITH SERVOCONTROL FOR TRACTOR VEHICLE AND ITS TRAILER
Raymond Boueil and Gérard Gardeux, Billancourt, France, assignors to Regie National des Usines Renault, Billancourt, France
Filed July 31, 1967, Ser. No. 657,115
Claims priority, application France, Aug. 2, 1966, 71,817
Int. Cl. B65t 13/00; B60t 13/16, 17/02
U.S. Cl. 303—7                                   7 Claims

ABSTRACT OF THE DISCLOSURE

Hydrostatic braking apparatus with servocontrol, for a tractor vehicle and its trailer, comprising a master cylinder and a servo distributor connected thereto and to the circuit of the said trailer and comprising brake pedals, each brake pedal acting mechanically on the control elements of the hydraulic circuit of the wheel to be braked and on the master cylinder supplying the hydrostatic braking pressure, the latter acting simultaneously on the servo distributor producing in return, from the liquid delivered by the vehicle pump, a hydraulic servo pressure on the said master cylinder in addition to and proportionally to the said mechanical braking force.

---

The present invention relates to a braking apparatus for a vehicle using a mixed hydrostatic and hydrodynamic hydraulic control, connected to the open center hydraulic power circuit belonging to the said tractor and comprising at least one other user device; it concerns more particularly a priority braking apparatus in the general hydraulic circuit, provided with individual elements for the braking of respectively the right wheel, the left wheel and the trailer of the said tractor, independently of one another, and the operation of which has no repercussions on the operation of the other devices, such as the lifting device, connected to the said circuit.

In fact, it is known from the U.S. Patent 3,360,303, filed May 9, 1966, and titled "A System for Controlling the Braking of a Vehicle Trailer by a Fluid Circuit Which Is Independent of the Towing Vehicle Brake Circuit and the Utilization for at Least One Other Function in Addition," to provide a distributor using the hydrodynamic energy supplied by the hydraulic power pump of a vehicle, creating the pressure necessary for a braking action by means of an adjustable throttling of the hydraulic fluid.

The object of the present invention is to use this hydraulic pressure not only for the direct braking of a trailer but also to act on a master cylinder to which a hydraulic servopressure is thus applied to supplement the direct mechanical action exerted on its piston by a brake pedal.

A hydrostatic braking apparatus according to the invention with servocontrol for a tractor vehicle and its trailer, comprising a master cylinder and a servodistributor connected thereto and to the braking circuit of the said trailer and comprising brake pedals, is characterised in that each brake pedal acts mechanically on the control elements of the hydraulic circuit of the wheel to be braked and on the master cylinder supplying the hydrostatic braking pressure, the latter acting simultaneously on the servodistributor producing in return from the liquid delivered by the vehicle pump a hydraulic servopressure on the said master cylinder in addition to and proportionally to the said mechanical braking force.

The aims and advantages of the present invention will be brought out from the following description associated with the drawings which illustrate diagrammatically the hydraulic braking control unit with the left and right brake pedals, and also the beginnings of the various hydraulic supply conduits.

Figure 1:
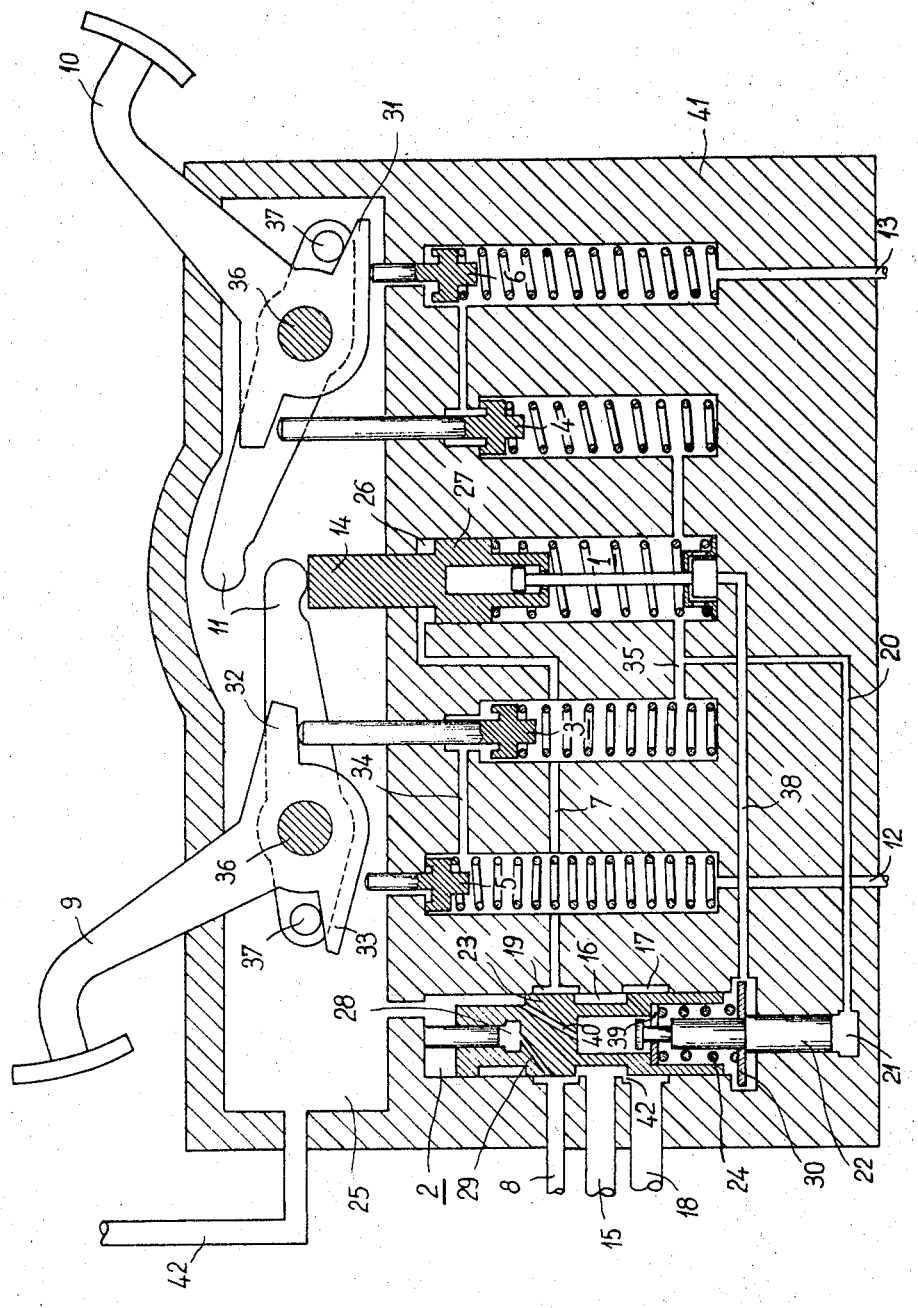
Figure 2:
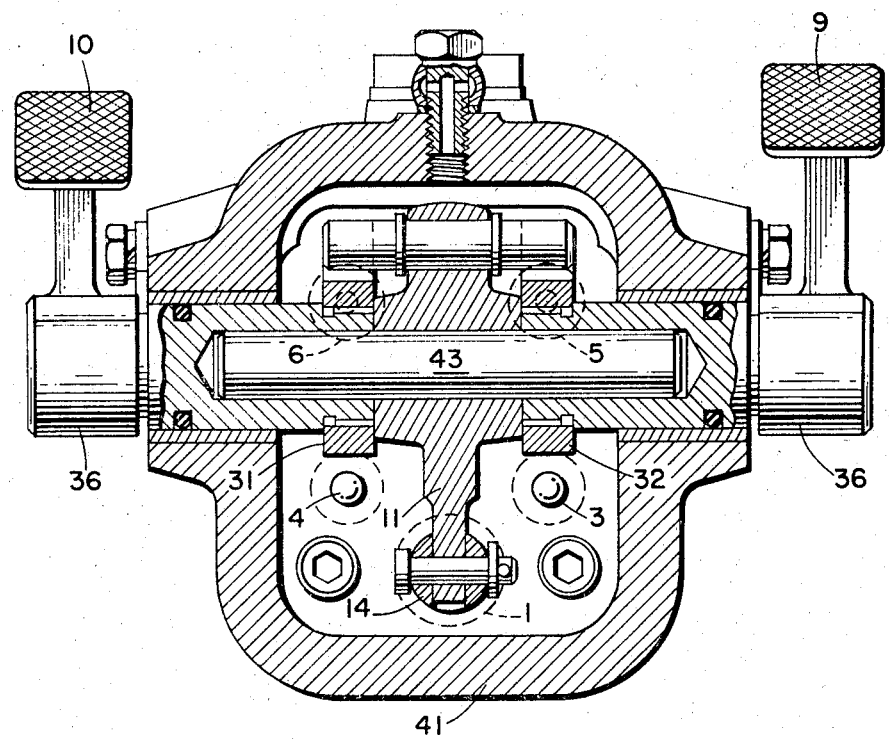

FIG. 1 is a schematic section of the invention; and
FIG. 2 is a plan view, partially in section, of the invention.

The apparatus according to the invention comprises essentially a master cylinder 1, a servodistributor 2 for which simpler descriptive details are indicated in the text of the patent application mentioned hereinbefore, and two admission selector valves 3 and 4 and two return selector valves 5, 6; each braking circuit for a wheel comprises a valve of each type.

The servodistributor 2 is connected to the master cylinder by the conduit 7 and to the trailer brakes by the conduit 8.

The left and right brake pedals 9, 10, respectively, of the tractor vehicle each act directly on the admission selector and the return selector situated in the hydraulic circuits 12 and 13 belonging respectively to the left wheel and the right wheel which they control and at the same time by way of the levers 11 on the push member 14 of the piston of the master cylinder.

As regards the operation of this apparatus: the oil coming from the pump arrives at 15 and, outside braking periods, after passing through the chambers 16 and 17 it flows out through the conduit 18 towards the other hydraulic elements of the vehicle before returning to the tank (not shown). In this position of the slide valve 23, the reserve 25 is isolated from the braking circuit, i.e., from the chamber 19 connected to the conduits 7 and 8 providing communication between the said chamber and the trailer brakes and the master cylinder 1, respectively.

The valve-type selection arrangement makes it possible optionally to brake each of the wheels of the vehicle separately or to brake both wheels simultaneously, with equal fluid pressures in the brakes of each wheel.

When the brake pedal is in the condition of rest like the right-hand brake pedal 10, as shown in the figure, the brake circuit for the right wheel is in communication with the tank 25, the valve 6 being held open by the cam 31 of the pedal and the brake being then pressureless.

In this same pedal position, the valve 4 is closed and prevents any communication between the master cylinder 1 and the right brake. As a result, a braking operation at the left wheel will have no action on the brake at the right wheel.

When a pedal is depressed, such as the left pedal 9 as shown in the drawing, the cam 32 opens the valve 3 at the same time as the cam 33 allows the valve 5 to close.

As a result the brake of the left wheel is isolated from the tank 25 and made to communicate with the master cylinder 1 by way of the conduits 12, 34 and 35; the pressure of the master cylinder 1 is then transmitted to the left brake alone.

When both pedals are depressed at the same time, the closing and opening are effected, as indicated hereinbefore, both at the left and at the right and it is found that the communication circuit with the left and right brakes is then such that the pressure of the master cylinder is established in both brakes.

Whilst the pedals act on the selector valves, they exert a force on the push member 14 controlling the master cylinder by way of levers 11 driven about fixed pivots 36 by the studs 37.

The master cylinder of a known type is supplied through the conduit 38 through the slide valve 23 after the passage of the liquid coming from the reserve 25 by way of the duct 40 and the apertures in the disc 39.

The operation of the hydrostatic braking apparatus is independent of the hydraulic circuit of the tractor supplied by the pump; indeed, in the case of an engine stoppage, interrupting the delivery of the pump, the braking of the tractor wheels is effected normally by the mechanical action of the pedals on the push member 14 but without hydraulic assistance of the piston 27.

At a braking operation brought about by the action of the driver on the pedals 9 and/or 10, the pressure which then rises in the master cylinder 1 by the application of the lever or levers 11 on the push member 14 of the piston of the said cylinder is transmitted, on the one hand, to the corresponding brake cylinders and, on the other hand, is directed by way of the conduit 20 into the chamber 21 and is then applied to the piston 22; the latter is then displaced under the action of the said pressure and pushes the slide valve 23 through the agency of the preloaded spring 24.

By its displacement, the slide valve 23 brings about the three following operations:

(a) The closing of communication between the chamber 19 and the fluid reserve 25;

(b) The opening of communication between the chamber 19 and the chamber 16 through which arrives, by means of the conduit 15 connected thereto, the fluid coming from the hydraulic pump of the vehicle;

(c) The throttling of the flow of the said fluid passing from the chamber 16 to the chamber 17.

The position of the slide valve 23 after this displacement is that shown in the drawing. The operation of throttling the fluid brings about a rise in pressure of the fluid in the chamber 16.

This pressure is communicated by the conduit 7 to the chamber 26 formed between the master cylinder and the piston 27 of the master cylinder, thus coming to assist the movement brought about by the mechanical action of the pedal on the push member 14.

At the same time this servopressure is also directed through the conduit 8 towards the trailer brakes. This same pressure also enters the chamber 28 and its action applied to the slide valve 23 opposes the action exerted by the piston 22; when these two opposite forces applied to the slide valve 23 become equal to one another, the said slide valve returns to a state of equilibrium. As a result, a given force applied to a pedal results in a force proportional thereto being exerted on the piston 22, to which there corresponds a specific pressure exerted on the piston 27 and on the trailer brakes, pressure prevailing in the chamber 16 and applied to the chamber 28 through the conduit 29 and then serving for balancing the slide valve 23 in the position which effects the throttling 42 of the flow of liquid precisely to the extent necessary for the establishing of the said pressure.

It may happen that, at the instant of braking, the hydraulic circuit of the tractor and more particularly the conduit 15 thereof is already under pressure owing to the effect of the operation of another hydraulic device and, depending on whether this pressure is greater than or less than the braking pressure, the operation of the apparatus is different.

Indeed, if the pressure is greater, the slide valve 23 serves as a pressure reducer between the chambers 16 and 19, and is displaced first of all to isolate the chamber 19 from the tank 25 and then, as soon as communication is established between the chamber 19 and the chamber 16, supplied through the conduit 15, the pressure rises in the chamber 19, in the braking circuit and also in the chamber 28 until the said pressure is sufficient to balance the force exerted by the piston 22 on the slide valve 23 since, at this instant, the communication is established between the chambers 16 and 19 is interrupted and in the brakes a pressure is then maintained which is proportional to the force exerted by the driver on the pedal, but independent of the said higher pressure prevailing in the general circuit of the vehicle.

When, on the other hand, the pressure brought about by the operation of another hydraulic device is insufficient to effect braking, the operation of the slide valve 23 is the same as was described first, but with the difference that the the pressure drop brought about by the throttling of the passage between the chambers 16 and 17 is not equal to the total pressure required for braking but only to the difference between the said braking pressure and the pressure prevailing in the circuit to which the said difference is added.

It is advantageous to limit the servopressure supplied into the chamber 26, and for this purpose it is sufficient to limit the force exerted by the piston 22 on the slide valve 23. For this purpose, the travel of the piston 22 is limited by the disc 30 fitted on to the end of the said piston, coming to abut against the valve body. At this instant, the slide valve is acted upon only by the force of the spring 24 compressed between the disc 30 and the slide valve 23. The pressure in the chamber 21 can then continue to rise without this modifying the equilibruim of the slide valve 23.

Under these conditions, it is the force of the spring 24 in its compressed position which determines the maximum value of the servopressure, and it is chosen accordingly.

What we claim is:

1. A hydrostatic braking apparatus, with servocontrol, for a tractor vehicle and its trailer, comprising a single master cylinder, a servodistributor connected thereto, a circuit of said trailer also connected to said master cylinder and comprising a pair of brake pedals, a fluid source including pump means to deliver pressurized fluid to said servodistributor and hydraulic circuits for each wheel brake and including control elements, each brake pedal being mechanically connected to act on the control elements of the hydraulic circuit of the wheel to be braked and on the master cylinder supplying hydrostatic braking pressure, the latter acting simultaneously on the servodistributor producing in return, from the liquid delivered by the fluid source, a hydraulic servopressure on said master cylinder in addition to and proportional to the mechanical braking force.

2. An apparatus according to claim 1 in which the control elements of each said hydraulic circuit comprise admission and return valves, cam means operatively connecting each said pedal to the respective admission and return valves.

3. An apparatus according to claim 2 wherein actuation of a single pedal causes braking of a single wheel corresponding to the circuit controlled.

4. An apparatus according to claim 2 wherein actuation of both pedals simultaneously causes an identical braking action on the two wheels, one and the same pressure being established in the two braking circuits by the action of the master cylinder.

5. An apparatus according to claim 1 wherein said pedals are mechanically operatively connected to simultaneously act on the master cylinder.

6. An apparatus according to claim 5 wherein the mechanical pressure exerted by at least one pedal on the master cylinder effects the braking action even without assistance, that is to say in the event of failure of the fluid source pressure.

7. An apparatus according to claim 1 wherein the maximum force, both the servo force and the braking force for the trailer, is limited by means for transmission of pressure to the servodistributor slide valve.

References Cited

UNITED STATES PATENTS 2,911,168   11/1959   Moreland.

MILTON BUCHLER, Primary Examiner.

JOHN J. McLAUGHLIN, JR., Assistant Examiner.

U.S. Cl. X.R.

188—152; 303—10, 13, 53